United States Patent [19]
Ault et al.

[11] Patent Number: 5,974,566
[45] Date of Patent: Oct. 26, 1999

[54] METHOD AND APPARATUS FOR PROVIDING PERSISTENT FAULT-TOLERANT PROXY LOGIN TO A WEB-BASED DISTRIBUTED FILE SERVICE

[75] Inventors: Michael Bradford Ault, Austin; Ernst Robert Plassmann, Pflugerville; Bruce Arland Rich, Round Rock; Shaw-Ben Shi, Austin; Theodore Jack London Shrader, Cedar Park, all of Tex.

[73] Assignee: International Business Machines Corporation, Armonk, N.Y.

[21] Appl. No.: 08/946,077

[22] Filed: Oct. 7, 1997

[51] Int. Cl.⁶ .................................................. G06F 13/00
[52] U.S. Cl. ............................. 714/15; 709/225; 709/304
[58] Field of Search .................................. 709/1, 9, 203, 709/225, 227, 229, 224, 304; 714/4, 15, 38, 47

[56] References Cited

U.S. PATENT DOCUMENTS

| | | | |
|---|---|---|---|
| 5,027,269 | 6/1991 | Grant et al. | 714/15 X |
| 5,029,169 | 7/1991 | Smyk | 714/38 |
| 5,317,752 | 5/1994 | Jewett et al. | 714/14 |
| 5,432,932 | 7/1995 | Chen et al. | 709/103 |
| 5,553,239 | 9/1996 | Heath et al. | 709/229 X |
| 5,606,659 | 2/1997 | Máløy | 714/47 |
| 5,715,386 | 2/1998 | Fulton, III et al. | 714/15 |
| 5,748,882 | 5/1998 | Huang | 709/224 |
| 5,754,830 | 5/1998 | Butts et al. | 709/227 X |

OTHER PUBLICATIONS

Fevzi Belli et al, An Approach to the Reliability Optimization of Software with Redundacy, Mar. 1991, pp. 310–312, IEEE Transactions on Software Engineering, vol. 17, No. 3.

James Purtilo et al., An Environment for Developing Fault-Tolerant Software, Feb. 1991, pp. 153–159, IEEE Transactions on Software Engineering, vol. 17, No. 2.

Primary Examiner—Zarni Maung
Assistant Examiner—Patrice L. Winder
Attorney, Agent, or Firm—Jeffrey S. LaBaw; David H. Judson

[57] ABSTRACT

A method of enabling persistent access by a Web server to files stored in a distributed file system of a distributed computing environment that includes a security service. A session manager is used to perform a proxy login to the security service on behalf of the Web server. Persistent operation of the session manager is ensured by periodically spawning new instances of the session manager process. Each new instance preferably initializes itself against a binding file. A prior instance of the session manager is maintained in an active state for at least a period of time during which the new instance of the session manager initializes itself. Upon receipt of a given transaction request from a Web client to the Web server, a determination is made regarding whether a new instance of the session manager process has been spawned while the Web server was otherwise idle. If so, the Web server is re-bound to the new instance of the session manager process so that the new instance of the session manager process can respond to the transaction request.

31 Claims, 4 Drawing Sheets

METHOD AND APPARATUS FOR PROVIDING PERSISTENT FAULT-TOLERANT PROXY LOGIN TO A WEB-BASED DISTRIBUTED FILE SERVICE

BACKGROUND OF THE INVENTION

1. Technical Field

The present invention relates generally to Web transaction processing and more particularly to techniques for enabling continuous access to Web documents stored in a secure distributed file system.

2. Description of the Related Art

The World Wide Web (WWW) of the Internet is the most successful distributed application in the history of computing. A conventional Web transaction involves a "client," which runs a browser, and a "server." In response to specification of a link at the browser, the client makes a request to the server identified in the link and, in return, receives a document or other object formatted according to HTML.

The Web server is usually a standalone file server that services various Web document requests. Because the server is self-contained, Web site administration is cumbersome because access control must be individualized for each device. Moreover, private and public enterprises are now setting up so-called "Intranets" within their organizations to allow employees and customers to access data on their own corporate Web sites. Such organizations use multiple computers interconnected into a distributed computing environment in which users access distributed resources and process applications. A known distributed computing environment, called DCE, has been implemented using software available from the Open Systems Foundation (OSF). As DCE environments become the enterprise solution of choice, many applications may be utilized to provide distributed services such as data sharing, printing services and database access. OSF DCE includes a distributed file system, called Distributed File Services (DFS), for use in these environments.

DFS provides many advantages over a standalone file server, such as higher availability of data and resources, the ability to share information throughout a very large-scale system, and protection of information by the robust DCE security mechanism. In particular, DFS makes files highly available through replication, making it possible to access a copy of a file if one of the machines where the file is located goes down. DFS also brings together all of the files stored in various file systems in a global namespace. Multiple servers can export their file system to this namespace. All DFS users, in the meantime, share this namespace, making all DFS files readily available from any DFS client machine.

As described in copending application, Ser. No. 08/790, 042, titled "Method And Apparatus For Enabling A Web Server To Impersonate A User Of A Distributed File System To Obtain Secure Access To Supported Web Documents," assigned to the assignee of the present application, it has been proposed to extend the functionality of existing standalone Web servers in the enterprise environment to take advantage of the scalability, file availability and security features of DFS (or other similar distributed file systems). As a by-product, users with an off-the-shelf browser would be able to easily access the Web information stored in the DFS namespace with no additional software on the client machine. In the proposed system illustrated in that copending application, a Web server and a DFS client both run on the same machine to provide secure access to DFS files via a Web browser. One of the components that makes this operation possible is a so-called "session manager." The session manager performs a "proxy DCE login" on behalf of a Web server process that is attempting to access the DFS filespace. In particular, the session manager provides the Web server process with a "DCE login context" (sometimes referred to as a "credential") that enables the Web server process to access DFS files securely with a valid DCE user identity.

The session manager is described as a process that is started at the same time as the Web server. Theoretically, the process runs forever, accepting requests from server processes for "proxy DCE logins" and maintaining an in-memory database of "DCE login context" information to help serve "repeated login requests" more quickly. The session manager, as envisioned in the above-identified application, must make calls to a security service to complete a proxy login. When these calls are made, memory must be allocated by the underlying DCE security code; this memory holds information associated with the DCE login context that is created. This memory is allocated within the virtual address space of the session manager process.

The management of this virtual memory is a challenge for the DCE security component. In the first instance, memory leak problems in the DCE code have been discovered with regularity. Any amount of memory leak, however, can be fatal to a theoretically "persistent" process as the virtual memory space becomes "bloated" and ultimately, unusable. Additionally, the DCE security code contains sophisticated memory re-use algorithms that prevent "memory login contexts" from being freed even after the owning process (e.g., session manager) instructs the DCE security component to release them. Experience with the memory management behavior of the DCE security component has also shown that, as a result of these issues, the session manager process will likely be challenged to survive for extended periods as its virtual memory pool continues to grow. If the session manager process aborts, further browser access to the DFS filespace is unavailable until session manager's "death" is somehow discovered and thereafter addressed (e.g., by manually restarting the session manager, or possibly by stopping and restarting the Web server itself).

The present invention addresses and solves this problem.

SUMMARY OF THE INVENTION

It is a primary object of the present invention to provide persistent, fault-tolerant proxy login service on behalf of a Web server process that is attempting to access a distributed filespace.

It is another object of the invention to enable a session manager process that provides proxy login services to "survive" in a hostile environment where the session manager process does not have control of virtual memory allocated on its behalf.

It is a further object of this invention to provide a fault-tolerant session manager process for proxy login on behalf of a Web server accessing Web documents stored in a distributed file system.

It is another more general object of this invention to ensure that there is no interruption to the availability of a session manager's proxy login service. As a by-product, a client browser may access Web documents stored in a distributed file system in a fault-tolerant manner.

It is a still further object of the invention to provide a control mechanism that enables a persistent session manager process to survive in a "hostile" environment and ensure that proxy login service provided by the process is available, without interruption, to ensure continuous browser access to a distributed filespace. The mechanism is also easily portable to other target distributed file system platforms.

These and other objects of the invention are provided in a method of enabling persistent access by a Web server to files stored in a distributed file system of a distributed computing environment. A session manager is used to perform a proxy login to a security service on behalf of the Web server. Persistent operation of the session manager is ensured by periodically spawning new instances of the session manager process. As part of its initialization, the session manager process generates a remote procedure call (RPC) string binding and places it into a binding file. A prior instance of the session manager is maintained in an active state for at least a period of time during which the new instance of the session manager is initialized. Upon receipt of a transaction request from a Web client to the Web server, a determination is made regarding whether a new instance of the session manager process has been spawned while the Web server was otherwise idle. If not, the Web server services the transaction request using a binding handle previously retrieved from the binding file and used to handle a prior request. If, however, the new instance of the session manager process has been spawned since the Web server serviced its last request, the Web server re-binds to the new instance of the session manager process. The new instance of the session manager process is then used to respond to the new transaction request. Preferably, communications to and from the session manager process are effected using an interprocess communication mechanism, such as a local remote procedure call.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
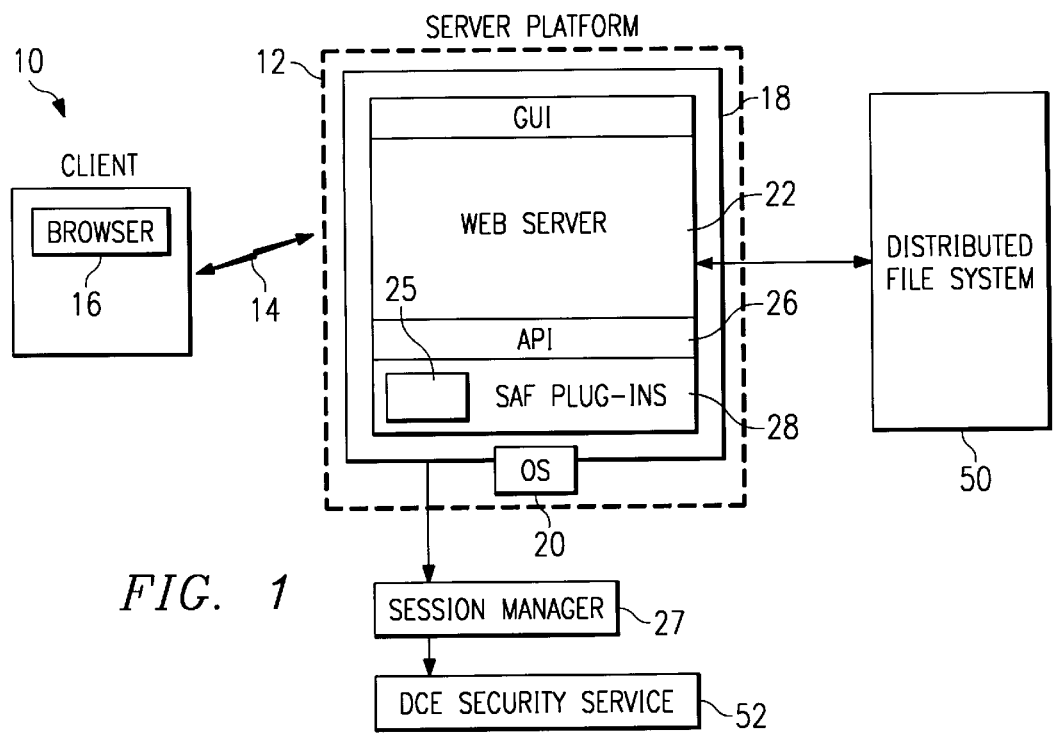
FIG. 1 is a representative system in which the server application function (SAF) plug-in and session manager of the present invention are implemented.

A representative system in which the present invention is implemented is illustrated in FIG. 1. A client machine 10 is connected to a Web server platform 12 via a communication channel 14. For illustrative purposes, channel 14 is the Internet, an Intranet or other known connection. In the case of the Internet, Web server platform 12 is one of a plurality of servers which are accessible by clients, one of which is illustrated by machine 10. A client machine includes a browser 16, which is a known software tool used to access the servers of the network. Representative browsers include, among others, Netscape Navigator (all versions), Microsoft Internet Explorer (all versions) or the like, each of which are "off-the-shelf" or downloadable software programs. The Web server platform (sometimes referred to as a "Web" site) supports files in the form of hypertext documents and objects. In the Internet paradigm, a network path to a server is identified by a so-called Uniform Resource Locator (URL). The World Wide Web is the Internet's multimedia information retrieval system. In particular, it is a collection of servers of the Internet that use the Hypertext Transfer Protocol (HTTP), which provides users access to files using Hypertext Markup Language (HTML).

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions. Web server program 22 generally runs a plurality of Web server processes in a known manner. The platform 12 also includes a graphical user interface (GUI) 24 for management and administration. The various models of the RISC-based computers are described in many publications of the IBM Corporation, for example, RISC System/6000, 7013 and 7016 POWERstation and POWERserver Hardware Technical Reference, Order No. SA23-2644-00. AIX OS is described in AIX Operating System Technical Reference, published by IBM Corporation, First Edition (November 1985), and other publications. While the above platform is useful, any other suitable hardware/operating system/web server combinations may be used.

Figure 2:
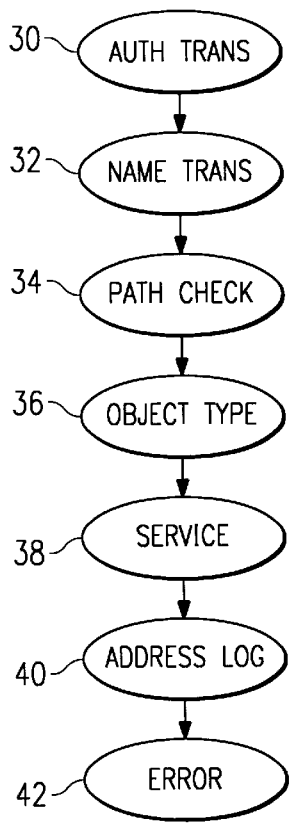
FIG. 2 is a flowchart of a conventional Web transaction implemented by a Web server in response to receipt of a request from a client machine.

The Web Server accepts a client request and returns a response. The operation of the server 18 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME type information (e.g., text/html, image/gif, etc.) for the given document is identified. At step 38, called Service (Service), the Web server routine selects an internal server function to send the result back to the client via a normal server-service routine. The particular function selected depends on the nature of the request. At step 40, called Add Log (AddLog), information about the transaction is recorded. At step 42, called Error, the server responds to the client when it encounters an error. Further details of these operations may be found in the *Netscape Web Server Programmer's Guide*, Chapter 5, which is incorporated herein by reference.

Thus, the Web server 18 includes a known set of server application functions (SAFs) 28. These functions take the client's request and other configuration data of the server as input and return a response to the server as output. Referring back to FIG. 1, the Web server 18 also includes an Application Programming Interface (API) 26 that provides extensions to enable application developers to extend and/or customize the core functionality thereof (namely, the SAFs) through software programs commonly referred to as "plug-ins." The present invention makes use of the server API 26 to provide for a plug-in SAF 25 that, together with a session manager process 27, facilitates special forms of authorization translation (AuthTran) and path checking (PathCheck) to enable Web access to documents on a distributed file system 50.

It is desirable to enable the user of the client machine 10 (intentionally or otherwise) to use the browser 16 to access, browse and retrieve documents located in the distributed file system 50. A plug-in SAF 25 and a session manager process 27 provide a mechanism to achieve this operation, as will be described below.

Returning briefly back to FIG. 1 for further background, a representative file system 50 is Distributed File Services (DFS), which is a known distributed file system implemented in a networked environment called the Distributed Computing Environment (DCE). DCE has been implemented using software available from the Open Systems Foundation (OSF). In a distributed computing environment, a group of machines is typically referred to as a "domain." An OSF DCE domain is called a "cell." A DCE cell may be a complex environment involving hundreds of machines in many locations.

DCE DFS 50 provides data sharing services by making use of remote procedure calls (RPC's) for naming, and a DCE Security Service 52 for authentication services. DFS 50 interfaces to the DCE Security Service 52 via the session manager process 27. As will be described, the session manager process returns a "credential" to the Web server process, which enables the Web server process to invoke DFS in an authenticated manner.

In particular, the session manager process uses so-called DCE Kerberos-based authentication. As is known in the art, a unix "credential" is associated with each file operation and holds the local authentication information for that operation. In particular, a credential is a data structure defining a particular machine (or a user on a multi-user machine). From the local operating system's point-of-view, the credential includes a user id, a group id, optionally a list of operating system privileges, and an authentication identifier known as a PAG (Process Authentication Group). The PAG acts as a tag for associating "tickets" between DFS 50 and the DCE Security Server 52. When DFS users authenticate via the DCE Login facility, known as $dce_{13}login$, the DCE Security Service interacts with DFS (across the network) through a setpag ( ) interface to establish the PAG/ticket relationship in the process's credential. On filesystem requests, DFS extracts the PAG from the credential structure to establish the DCE user's authentication for RPC requests to the DFS fileserver.

Figure 3:
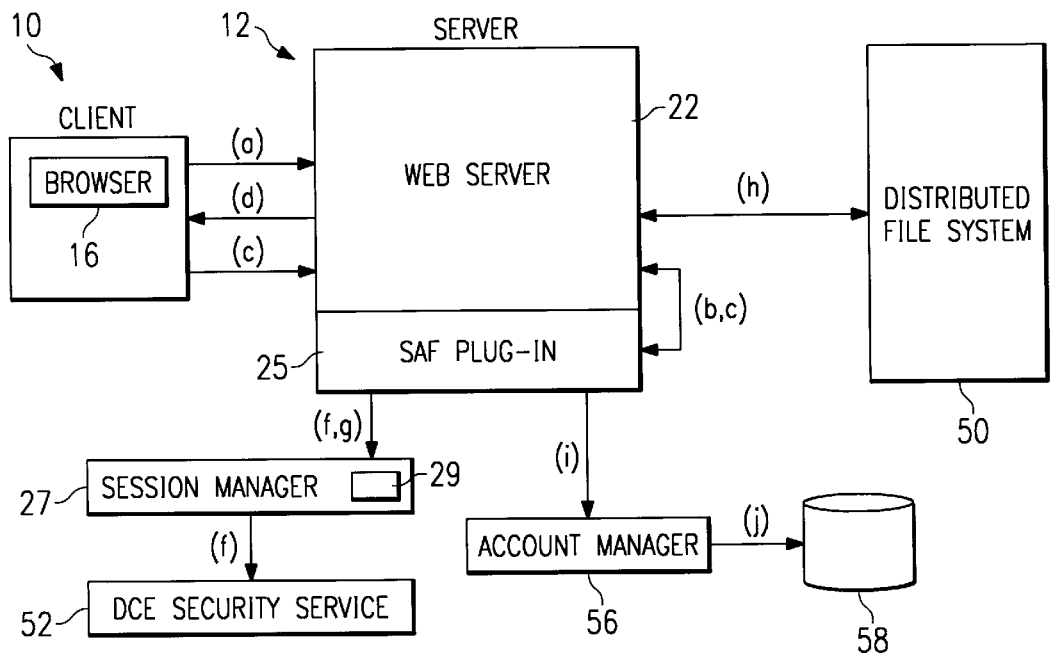
FIG. 3 is a process flow diagram illustrating a Web transaction implemented according to the teachings of the present invention.

The control flow associated with the process is illustrated in the flow diagram of FIG. 3, and the following discussion is provided by way of further background toward understanding the context of the present invention. This diagram illustrates the basic system of FIG. 1, with the inclusion of an account manager 56 having an associated database 58. Session manager process 27 theoretically starts up upon initialization of the Web server and is preferably run by the workstation computer 18. The session manager process may include its own storage area 29. When the client 10 (through the browser 16) requests a DFS document (step a), the Web server 18 invokes a server path check (using the SAF plug-in 25) (step b). The PathCheck checks with the session manager 27 to determine whether the user has appropriate DCE credentials. If not (step c), the SAF plug-in 25 will return an error message (e.g., "401; Unauthorized") to the browser 16 (step d) and prompt the user for user id and password. After getting the userid and password from the user (step e), the SAF plug-in invokes the session manager 27 (step f) to obtain the DCE credential for the user. Session manager 27 returns the DCE credential to the Web server (step g). The server then uses this user credential to represent the user to retrieve documents stored in DFS 50 (step h). After retrieving the documents, the account manager 56 is invoked (step i) (preferably using another API plug-in) to save appropriate usage information into the database 58 (step j).

The session manager 27 is thus invoked by the Web Server when a user attempts to access a DFS file. If a user has already been authenticated by DCE, the Session Manager 27 returns the user credential to the server, which uses this credential to retrieve DFS documents on behalf of the user. If not, the session manager 27 will login for the user and obtain the credential from DCE Security. The session manager maintains the in-memory database 29 to keep track of which user has logged in so that redundant logins need not be performed.

The proxy login function provided by the session manager must be fault-tolerant. If the session manager fails, then continuous access to the DFS file space cannot be provided. This is the problem solved by the present invention. In particular, and with reference now to FIG. 4, a session manager process control mechanism 70 is provided in addition to the session manager process 27 as previously described. Control mechanism 70 functions generally to periodically spawn a new instance of the session manager (with each new instance identified by the reference numerals 72a–72n) for use in interfacing the server platform to the security service. A binding file 74 (or other convenient data storage) is used to store string bindings to facilitate communications between the server and a particular session manager instance.

Figure 4:
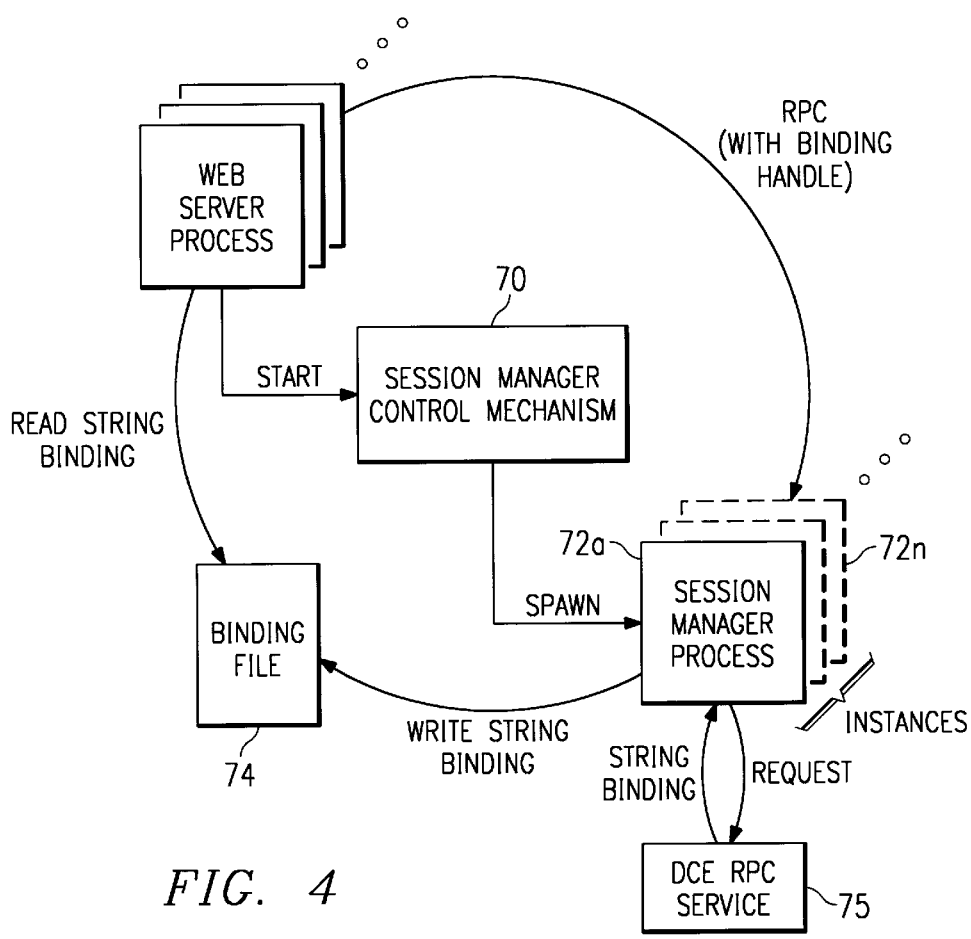
FIG. 4 is a block diagram illustrating how the session manager process controller of the present invention interfaces with the remainder of the system to provide persistent, fault-tolerant, proxy login service.

In particular, and as seen in FIG. 4, a particular Web server process acting as an "RPC client" communicates (through the RPC mechanism) to a particular session manager process instance acting as an "RPC server." Before such communication may take place, however, the Web server process has to know where the session manager process is located. To this end, the session manager process must be initialized. In particular, when a session manager process instance is spawned, it first communicates with the DCE RPC Service 75. RPC Service 75 returns a string binding to the session manager process instance. A string binding, which is typically in the form of an ASCII text string, provides information as to how a prospective RPC "client" may connect to the RPC server, namely, the session manager process instance. Each session manager process instance "writes" its string binding to the binding file 74 to complete its initialization.

When a Web server process (the RPC client) needs to communicate with a particular session manager process instance, it "reads" the string binding from the binding file 74 and then converts the string binding into a "binding handle." The binding handle is then use to make a remote procedure call to the session manager process instance. Thus, as illustrated in FIG. 4, the RPC communication path is between a Web server process and a particular session manager process instance. Because the Web server process and the session manager process preferably run on the same machine, the RPC may be effected "locally" (e.g., through an interprocess communication (IPC) mechanism).

Figure 5:
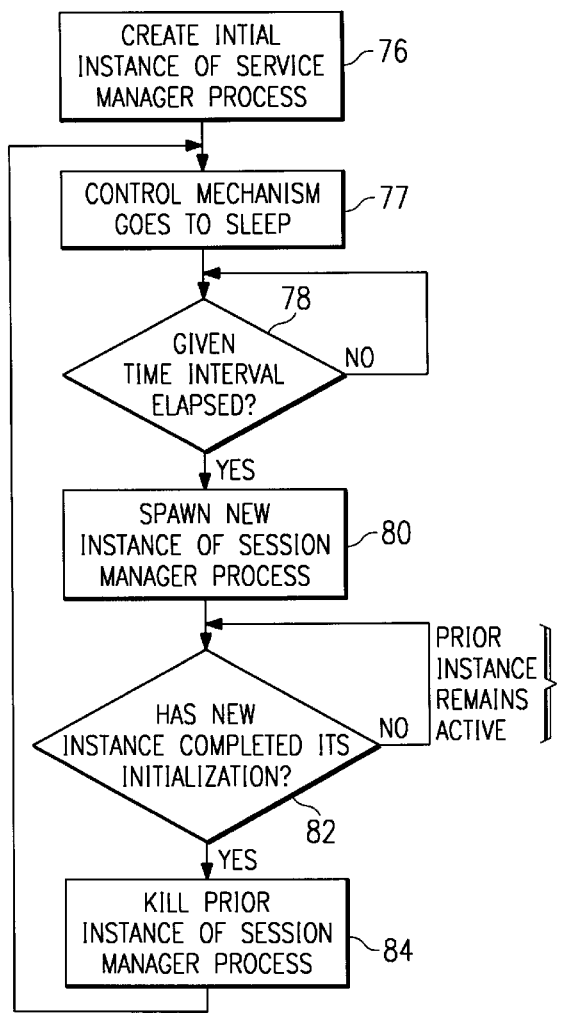
FIG. 5 is a flowchart illustrating how a session manager controller spawns new session manager(s) for use in providing the proxy login service.

FIG. 5 is a flowchart illustrating how the session manager controller spawns new session manager(s) for use in providing the proxy login service. In general, the method begins at step 76 with the creation of an initial instance of the session manager process. At step 77, the session manager process control mechanism 70 preferably goes to "sleep" for a given interval (e.g., 24 hours). At step 78, a test is made to determine whether it the given interval has elapsed. If the outcome of the test at step 78 is negative, the routine returns. If, however, the outcome of the test at step 78 is positive, the routine branches to step 80 to spawn a new instance of the session manager on an unused communications port. At step 82, a test is then made to determine whether the new instance of the session manager has completed its initialization. Typically, the session manager process instance effects its own initialization by generating an RPC string binding and placing it into the binding file 74. If the outcome of the test at step 82 indicates that the new instance is initialized, then the routine continues at step 84 with the control mechanism killing the prior instance. After the prior instance is killed, the routine returns to just after step 76. If desired, a given "delay" period may be inserted prior to step 84 to ensure that the new instance has had an opportunity to assume control of the proxy login service. If, however, the outcome of the test at step 82 indicates that the new instance has not completed its initialization, the routine cycles to enable the prior session manager process instance to remain available to service requests (or to complete the servicing of requests in progress).

Thus, according to one feature of the present invention, a new instance of a session manager process is periodically spawned by the control mechanism 70 to ensure that a particular instance of session manager is not impacted as its virtual memory pool grows. In a preferred embodiment, the control mechanism 70 spawns a new instance of session manager on a periodic basis, however, one of ordinary skill will appreciate that step 78 may be generalized. Thus, the decision to spawn the new session manager process instance may depend on any number of factors, such as the state of the virtual memory previously allocated (by the security service) to the prior instance of the session manager, the number of transaction requests serviced over a given time interval, or any combination of one or more of the above or other factors. As a new instance of the session manager comes into service, a prior instance of the process is maintained in an active state to ensure continuity of the proxy login service. This sequence of steps below prevents any interruption to the proxy DCE-login service that might otherwise occur were the session manager process operated in a standalone manner unable to control the virtual memory allocated on its behalf by the security service.

Figure 6:
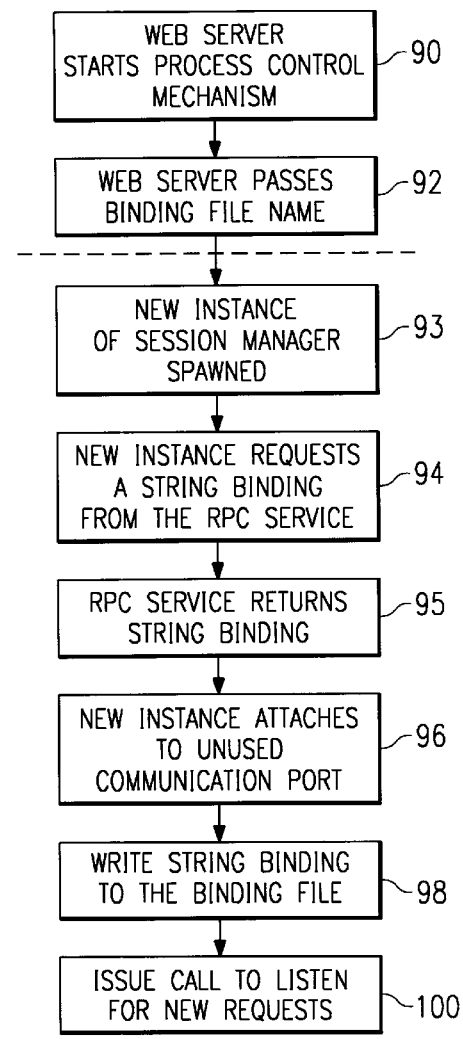
FIG. 6 is a flowchart illustrating how a new instance of a session manager initializes itself against a binding file.

FIG. 6 is a more detailed flowchart illustrating how a new instance of a session manager is initialized. The routine begins at step 90 when the session manager process control mechanism 70 is started by the Web server. At step 92, the Web server passes the session manager control mechanism a "binding file name" which the control mechanism, in turn, passes along to each session manager process instance that the control mechanism starts or restarts.

In particular, assume a new session manager process instance is spawned at step 93 (and as described above) At step 94, the new session manager process instance requests a string binding from the RPC Service. A string binding is returned at step 95. At step 96, the new session manager process instance attaches itself to an unused communications port. The new process instance then writes the string binding to the binding file at step 98. Writing the new string binding updates the binding file to reflect the "replacement" of the old session manager by the new session manager. Thereafter, at step 100, the new session manager process instance issues an rpc_server_listen( ) call to begin listening for new transaction requests from the Web server processes. Thus, each new session manager process instance completes this binding file update prior to assuming control of the proxy login function.

Figure 7:
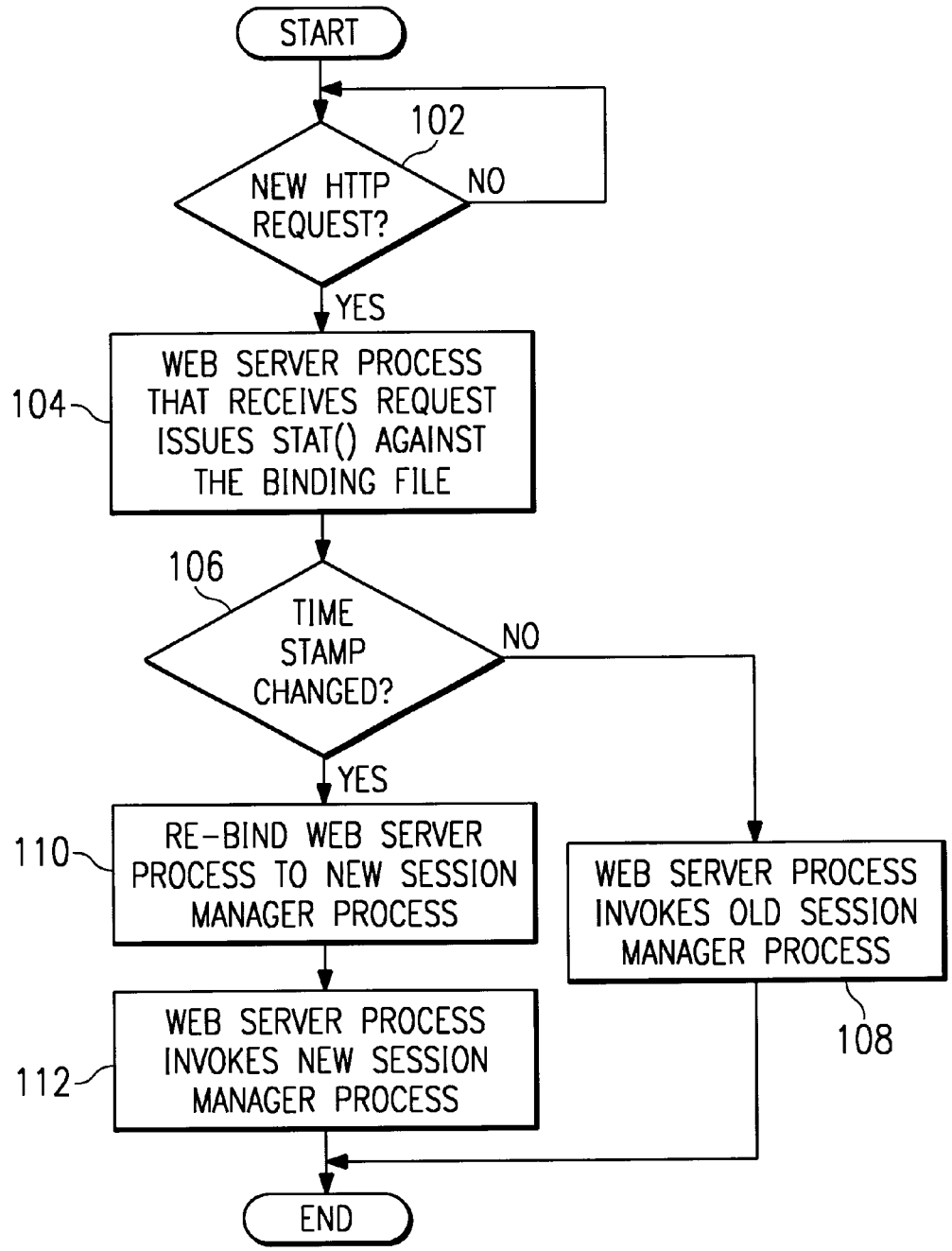
FIG. 7 is a flowchart illustrating the processing of a transaction request from the Web server.

Referring now to FIG. 7, a flowchart is shown of a preferred technique for processing transaction requests. Typically, a transaction request is a HTTP GET request delivered from a Web client to a Web server process, and the Web server platform normally runs multiple server processes. In a preferred embodiment, the various Web server processes are only aware of a single binding file 74. The routine begins at step 102 with a test to determine whether a new transaction request has been received from a Web server process.

If, however, the outcome of the test at step 102 is negative, the routine cycles and the plug-in waits for an incoming request. If, however, the outcome of the test at step 102 is positive (which indicates that the Web server process has received a request for a file from the distributed namespace), the routine continues at step 104 by having the particular Web server process issue a stat ( ) (or other suitable status) call against the binding file. The purpose of this call is to enable the Web server process initiating the request to learn the date and time that the binding file was last modified. A test is then run at step 106 to determine if the date and time of the binding file have changed since the last request serviced by this process. If the outcome of the test at step 106 indicates that the binding file has not been updated, then the routine continues at step 108 with the Web server process invoking session manager using a binding handle that it used on the last request serviced. This is because no new session manager process has been started while this Web server process was idle. If the outcome of the test at step 106 indicates that the date and time of the binding file have changed since the last request serviced by this process (i.e. the session manager has been replaced with a new session manager while this Web server process was idle), then the routine branches to step 110. At this point, the Web server process "re-binds" (i.e. obtains a new binding handle) to the "new" session manager process instance using the new string binding found in the binding file (which has been updated by the new session manager process instance). Thus, the Web server process reads the string binding in the binding file, and then converts the string binding into the binding handle. After rebinding, the Web server process invokes the "new" session manager at step 112 to process the transaction request.

As noted above, the old session manager process instance, which continues to listen on a different port, remains available to service requests throughout all of this activity until the new session manager becomes available. The switch over to the new session manager process instance is preferably gated by the update of the binding file. Thus, there is no interruption to the availability of the session manager's proxy login service while the old session manager process is being replaced with a new one. As noted above, the old session manager is leisurely killed sometime later by the session manager process controller after the new session manager has had a chance to assume control of the proxy DCE login function.

It should be appreciated that, in the preferred embodiment, the new session manager process instance is a child process of the session manager process controller. Thus, in the unlikely event that a particular session manager instance aborts, a signal handler in the control mechanism is notified. The signal handler then awakens the process controller to start another new instance of the session manager process.

Thus, according to a preferred aspect of the present invention, a session manager process controller is used, preferably as a standalone process that is started in place of the session manager process during the initialization of the Web server. When the session manager controller is started, it starts an initial "instance" of the session manager process and then goes to sleep. Periodically, the session manager controller wakes up to start a new session manager process instance and, after a given time, "kills" the previous session manager process, which by then may have become bloated with memory growth. The session manager process controller then goes back to sleep. If the session manager process should abort unpredictably, however, the session manager controller instantly detects the failure and restarts a new session manager process.

The probability that the session manager process will abort unpredictably due to memory growth problems is minimized by periodically killing and restarting the session manager process from the "session manager controller," which has no memory growth exposures of its own. This "re-cycling" of the session manager process enables the session manager to be "fault-tolerant" in an environment where it is unable to control its own memory growth.

One of the preferred implementations of the plug-in and session manager of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via a computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific distributed file system environment, those skilled in the art will recognize that the invention can be practiced, with modification, in other and different hardware and operating system architectures with the spirit and scope of the appended claims. Thus, for example, while the present invention is preferably implemented to allow off-the-shelf browsers to access Web documents stored in DFS, the principles of the invention are equally applicable with other known architectures such as AFS (from which DFS was derived), as well as the Network File System (NFS) developed by Sun Microsystems.

Moreover, implementation in OSF DCE is not a requirement of the present invention either.

Further, it should be appreciated that the browser, Web server and distributed file system architecture in which the present invention is implemented can be generalized as well. In particular, the Web server may be thought of as merely a "gateway" function to provide one or more users (the Web clients in the context of the invention) access to resources in some "environment" (e.g., the distributed file system) that may or may not be on a different machine. Thus, the present invention can be seen to provide an efficient way for any gateway function to rapidly modulate between the identities that it presents to the user (from the view of the user-space) and to the environment (from the view of the environment kernel). According to the invention, it is envisioned that a user login credential be saved in the session manager for reuse across gateway transactions and that the gateway impersonate the user using this credential to obtain a service from the environment. The performance enhancements described (re-use of authentication information across multiple transactions and persistent operation of the session manager) would apply as well.

Although the present invention has been described in the context of providing secure access to a distributed file system service via a persistent proxy login service, it should be appreciated that the problem addressed by the present invention also has broader applicability. The session manager process may be generically considered as any process that makes calls to a system service that then allocates virtual memory on behalf of that process. In that scenario, there may be circumstances in which the virtual memory allocated on behalf of the process is not readily released for whatever reason. Whenever a process of this type attempts to survive in such an environment, it thus may be desirable to periodically wakeup and start a new instance of the process, and then retain the new process together with the previous instance thereof, in the manner previously described. In particular, the new instance of the process updates the string binding file with information (e.g., a timestamp) that tells the plug-in code how to communicate with the new instance. Upon receipt of a new request to the plug-in (which, in the preferred embodiment, involves an HTTP request received at the Web server), the plug-in checks the information. If the timestamp indicates that a new instance of the process exists, the plug-in obtains a new binding handle against which a local RPC is then generated. Using the local RPC, the plug-in communicates with the process to obtain the service (in this case, obtain a user credential). The old process instance continues to operate for some period after the new process instance is spawned. After a given time, the old process instance is killed, thereby freeing up the system service resources.

More generally, one of ordinary skill will appreciate that the invention may be used to limit the amount of memory (e.g. virtual memory) required by a process performing a task. Thus, this object may be achieved by periodically spawning anew instance of the process. Whenever the process receives a request to perform the task, a determination is made regarding whether a new instance has been spawned. If so, the request is assigned to the new instance and, if necessary, an existing instance is then killed. Preferably, before the new request is assigned to the new instance, a test is also performed to ensure that control of the task can be safely transferred from the existing instance to the new instance. The instance(s) preferably have independent storage requirements, and thus this technique ensures that the amount of memory required by the process, per se, is limited.

Having thus described our invention, what we claim as new and desire to secure by letters patent is set forth in the following claims:

We claim:

1. A method of enabling persistent access by a Web server to files stored in a distributed file system of a distributed computing environment, the distributed computing environment including a security service for returning a credential to a user authenticated to access the distributed file system, and wherein a session manager is used to perform a proxy login to the security service on behalf of the Web server, the method comprising the steps of:

periodically spawning a new instance of the session manager process;

responsive to receipt of a transaction request from a Web client to the Web server, determining whether a new instance of the session manager process has been spawned while the Web server was otherwise idle;

if a new instance of the session manager process has been spawned while the Web server was otherwise idle, rebinding the Web server to the new instance of the session manager process so that the new instance of the session manager process can respond to the transaction request.

2. The method as described in claim 1 wherein if a new instance of the session manager process has not been spawned while the Web server was otherwise idle, having the Web server process the transaction request using a binding handle associated with a prior transaction request.

3. The method as described in claim 1 further including the step of having the new instance of the session manager process respond to the transaction request by performing the proxy login to the security service.

4. The method as described in claim 3 further including the step of returning a credential from the new instance of the session manager process to the Web server.

5. The method as described in claim 4 wherein the credential is returned using a local remote procedure call.

6. The method as described in claim 1 wherein after the new instance of the session manager process is spawned, a prior instance of the session manager process is maintained in an active state for at least a given time period.

7. The method as described in claim 6 wherein the prior instance of the session manager process is maintained in the active state at least until the new instance of the session manager completes an update of a binding file.

8. The method as described in claim 6 further including the steps of monitoring each new instance of the session manager process for an abort;

if an abort occurs, immediately initiating a new instance of the session manager process.

9. The method as described in claim 1 wherein the Web client includes a browser and is connected to the Web server via the World Wide Web of the Internet.

10. A method of enabling persistent access by a Web server to files stored in a distributed file system of a distributed computing environment, the distributed computing environment including a security service for returning a credential to a user authenticated to access the distributed file system, and wherein a session manager is used to perform a proxy login to the security service on behalf of the Web server, the method comprising the steps of:

responsive to receipt of a transaction request from a Web client to the Web server, determining whether a new instance of the session manager process has been spawned while the Web server was otherwise idle;

if a new instance of the session manager process has not been spawned while the Web server was otherwise idle, having the Web server process the transaction request using a binding handle associated with a prior transaction request; and if a new instance of the session manager process has been spawned while the Web server was otherwise idle, rebinding the Web server to the new instance of the session manager process so that the new instance of the session manager process can respond to the transaction request using a new binding handle.

11. The method as described in claim 10 wherein after the new instance of the session manager process is spawned, a prior instance of the session manager process is maintained in an active state for at least a given time period.

12. The method as described in claim 11 wherein the prior instance of the session manager process is maintained in the active state at least until the new instance of the session manager completes an update of a binding file in which the binding handles are stored.

13. The method as described in claim 10 wherein the new instance of the session manager process communicates with the Web server using an interprocess communication.

14. The method as described in claim 13 wherein the interprocess communication is a local remote procedure call (RPC).

15. The method as described in claim 10 wherein the Web client includes a browser and is connected to the Web server via the World Wide Web of the Internet.

16. A computer program product in computer-readable media for enabling persistent access by a Web server to files stored in a distributed file system of a distributed computing environment, the distributed computing environment including a security service for returning a credential to a user authenticated to access the distributed file system, and wherein a session manager is used to perform a proxy login to the security service on behalf of the Web server, the computer program product comprising:

first program code means for periodically spawning a new instance of the session manager process;

second program code means, responsive to receipt of a transaction request from a Web client to the Web server, for determining whether a new instance of the session manager process has been spawned while the Web server was otherwise idle; and third program code means, responsive to a determination that a new instance of the session manager process has been spawned while the Web server was otherwise idle, for rebinding the Web server to the new instance of the session manager process so that the new instance of the session manager process can respond to the transaction request.

17. The computer program product as described in claim 16 further including means for maintaining a prior instance of the session manager process in an active state for at least a given time period after a new instance of the session manager process is spawned.

18. The computer program product as described in claim 16 wherein the third program code means rebinds to the Web server by generating a remote procedure call (RPC) string binding and placing the RPC string binding in a binding file.

19. The computer program product as described in claim 16 wherein the third program control means is responsive to a determination that a new instance of the session manager process has not been spawned while the Web server was otherwise idle for instructing the Web server process to handle the transaction request using a binding handle associated with a prior transaction request.

20. A computer connectable to a distributed computing environment having a distributed file system service and a security service for returning a credential to a user authenticated to access the distributed file system, the computer comprising:

a processor;

an operating system;

a Web server program for providing World Web Wide information retrieval to Web clients connectable to the Web server program via a stateless computer network;

a session manager process for performing a proxy login to the security service on behalf of the Web server program; and a session manager control program, comprising:

first program code means for periodically spawning a new instance of the session manager process;

second program code means, responsive to receipt of a transaction request from a Web client to the Web server, for determining whether a new instance of the session manager process has been spawned while the Web server was otherwise idle; and third program code means, responsive to a determination that a new instance of the session manager process has been spawned while the Web server was otherwise idle, for rebinding the Web server to the new instance of the session manager process so that the new instance of the session manager process can respond to the transaction request.

21. The computer as described in claim 20 further including an interprocess communication mechanism for controlling communications between the Web server program and the session manager process instance.

22. The computer as described in claim 21 wherein the interprocess communication mechanism uses local remote procedure calls for the communications.

23. The computer as described in claim 20 wherein the session manager control program further includes means for maintaining a prior instance of the session manager process in an active state for at least a given time period after a new instance of the session manager process is spawned.

24. A method of enabling a server process to persistently impersonate a user, the server process connectable to an environment having a security service for returning a credential to a user authenticated to access a service in the environment, wherein a session manager is used to perform a proxy login to the security service on behalf of the server process, the method comprising the steps of:

periodically spawning a new instance of the session manager process;

responsive to receipt of a transaction request from a user to the server process, determining whether a new instance of the session manager process has been spawned while the server process was otherwise idle;

if a new instance of the session manager process has been spawned while the server process was otherwise idle, rebinding the server process to the new instance of the session manager process so that the new instance of the session manager process can respond to the transaction request.

25. The method as described in claim 24 wherein the server process is a gateway function that provides the user access to the environment.

26. The method as described in claim 25 wherein the gateway function is a Web server, the user is a client browser, and the environment is a distributed file system service.

27. The method as described in claim 26 wherein the distributed file system service is DFS.

28. A method of enabling persistent access by a task to files stored in a file system of a computing environment, wherein a session manager process is used to perform a proxy login on behalf of the task, the method comprising the steps of:

periodically spawning a new instance of the session manager process;

responsive to receipt of a transaction request to the task, determining whether a new instance of the session manager process has been spawned while the task was otherwise idle;

if a new instance of the session manager process has been spawned while the task was otherwise idle, associating the task to the new instance of the session manager process so that the new instance of the session manager process can respond to the transaction request.

29. The method as described in claim 28 wherein if a new instance of the session manager process has not been spawned while the task was otherwise idle, having the task process the transaction request using a data structure associated with a prior transaction request.

30. The method as described in claim 28 further including the step of having the new instance of the session manager process respond to the transaction request by performing the proxy login on behalf of the task.

31. The method as described in claim 30 wherein the task is a Web server, the file system is a distributed file service, and the transaction request identifies a Web document supported in the distributed file service.

* * * * *